(12) United States Patent  
Park et al.

(10) Patent No.: US 8,130,671 B2  
(45) Date of Patent: Mar. 6, 2012

(54) METHOD AND SYSTEM FOR ESTABLISHING BIDIRECTIONAL TUNNEL

(75) Inventors: Soo-hong Park, Yongin-si (KR); Min-ho Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1310 days.

(21) Appl. No.: 11/259,275

(22) Filed: Oct. 27, 2005

(65) Prior Publication Data

US 2006/0092964 A1    May 4, 2006

(30) Foreign Application Priority Data

Oct. 28, 2004    (KR) .................. 10-2004-0086547

(51) Int. Cl.
*H04L 12/28* (2006.01)
(52) U.S. Cl. .............. 370/254; 370/395.5; 370/401; 370/466
(58) Field of Classification Search .......... 370/409
See application file for complete search history.

(56) References Cited

U.S. PATENT DOCUMENTS

| | | | | |
|---|---|---|---|---|
| 6,286,038 | B1 | 9/2001 | Reichmeyer et al. | 709/220 |
| 6,862,274 | B1* | 3/2005 | Tsao et al. | 370/338 |
| 2001/0040895 | A1* | 11/2001 | Templin | 370/466 |
| 2003/0212892 | A1* | 11/2003 | Oishi | 713/168 |
| 2004/0006641 | A1* | 1/2004 | Abrol et al. | 709/245 |
| 2004/0013130 | A1 | 1/2004 | Blanchet et al. | |
| 2004/0037260 | A1* | 2/2004 | Kakemizu et al. | 370/338 |
| 2004/0047322 | A1* | 3/2004 | O'Neill | 370/338 |
| 2004/0088385 | A1* | 5/2004 | Blanchet et al. | 709/220 |
| 2004/0093434 | A1* | 5/2004 | Hovell et al. | 709/249 |
| 2004/0133692 | A1 | 7/2004 | Blanchet et al. | |
| 2004/0136358 | A1* | 7/2004 | Hind et al. | 370/352 |
| 2004/0184465 | A1* | 9/2004 | Lee et al. | 370/400 |
| 2004/0205233 | A1 | 10/2004 | Dunk | |
| 2004/0252653 | A1* | 12/2004 | Shimizu et al. | 370/310 |
| 2005/0238009 | A1* | 10/2005 | Bell | 370/389 |

(Continued)

FOREIGN PATENT DOCUMENTS

CN    1435981 A    8/2003

(Continued)

OTHER PUBLICATIONS

Chinese Patent Office Action, mailed Feb. 9, 2007, and issued in corresponding Chinese Patent Application No. 2005101170123.

(Continued)

*Primary Examiner* — Chirag Shah
*Assistant Examiner* — Daniel Mitchell
(74) *Attorney, Agent, or Firm* — Staas & Halsey LLP (57) ABSTRACT

A method and system establish a bi-directional tunnel through direct communication between a tunnel end point (TEP) and a user node without user assistance. The method includes: operating the user node in order to establish the bi-directional tunnel, wherein operating the user node includes: requesting network information necessary for establishing the bi-directional tunnel to the DHCP server; when the user node receives the network information from the DHCP server, establishing a unidirectional tunnel from the user node to the TEP based on the received network information; requesting one of the TEPs to establish the unidirectional tunnel; and when the user node receives a router advertisement (RA) message of a second network with which the user node wishes to communicate from the TEP required to establish the unidirectional tunnel, establishing an address of the user node in the second network.

19 Claims, 6 Drawing Sheets

U.S. PATENT DOCUMENTS

| | | | | |
|---|---|---|---|---|
| 2006/0002324 | A1* | 1/2006 | Babbar et al. | 370/325 |
| 2006/0129694 | A1* | 6/2006 | Ishida et al. | 709/238 |

FOREIGN PATENT DOCUMENTS

| | | |
|---|---|---|
| CN | 1529480 A | 9/2004 |
| JP | 2001-274845 | 10/2001 |
| JP | 2002-111738 | 4/2002 |
| JP | 2004-56382 | 2/2004 |
| JP | 2004-104664 | 4/2004 |
| KR | 2003-0065075 | 8/2003 |
| KR | 2003-0094724 | 12/2003 |
| KR | 10-2004-0074436 | 8/2004 |
| WO | 01/31888 | 5/2001 |

OTHER PUBLICATIONS

European Examination Report, mailed Nov. 24, 2006, and issued in corresponding European Patent Application No. 05 256 641.1-2413.

Alexander Silicon Graphics et al., DHCP Options and BOOTP Vendor Extensions, IETF Standard, Internet Task Force, IETF, Mar. 1997, abstract, paragraphs 01.2, 03.5, 09.1, and 09.6-09.8.

J. Wiljakka, Transition to IPV6 in GPRS and WCDMA Mobile Networks, IEEE Communications Magazine, IEEE Service Center, New York, NY Apr. 2002, vol. 40, No. 4, pp. 134-140.

R. Droms, Dynamic Host Configuration Protocol, IETF Standard, Internet Engineering Task Force, IETF, Mar. 1997, pp. 1-45, abstract, paragraphs 001, 03.1, 03.7, 4.3.1, 4.3.2, and 04.4.

* cited by examiner

```
Samsung Electronics Auto TEP Configuration Client v0.9rc1
Copyright 2004 Samsung Electronics.
All rights reserved.

DHCP Client Started.
Listening on LPF/eth0/00:d0:b7:b0:88:c3
Sending on   LPF/eth0/00:d0:b7:b0:88:c3
Listening on LPF/lo/
Sending on   LPF/lo/
Sending on   Socket/fallback
DHCPDISCOVER on eth0 to 255.255.255.255 port 67 interval 4
DHCPOFFER from 192.168.0.10
Suggested TEP Address is 192.168.0.1
DHCPREQUEST on eth0 to 255.255.255.255 port 67
DHCPACK from 192.168.0.10
Suggested TEP Address is 192.168.0.1
bound to 192.168.0.57 -- renewal in 32583 seconds.
DHCP Client Finished.

Setting one way IPv6 Tunnel... OK.
Tunnel configuration Request Send... OK.
Tunnel configuration Reply Receive... OK.
IPv6 TEP Address : 192.168.0.1 Configured
Receiving Router Advertisement from TEP... OK.
Processing Auto configuration... OK.
Tunnel & IPv6 address Configuration finished.

Configuration of sit1
sit1      Link encap:Ethernet  HWaddr 00:D0:87:B0:68:C3
          inet addr:192.168.0.57  Bcast:192.168.0.255  Mask:255.255.255.192
          inet6 addr : 3ffe:ffff:100::5/64 Scope:Global
          inet6 addr : fe80::2a0:c9ff:fe8a:6044/64 Scope:Link
          UP BROADCAST RUNNING MULTICAST  MTU:1500  Metric:1
          RX packets:5 errors:0 dropped:0 overruns:0 frame:0
          TX packets:7 errors:0 dropped:0 overruns:0 carrier:0
          collisions:0 txqueuelen:100
          RX bytes:7516 (7.3 Kb)  TX bytes:6302 (6.1 Kb)
          Interrupt:3 Base address:0x2400 Memory:c9202000-c9202038
          TEP(Tunneling End Point) Address : 192.168.0.1

[root@andylinux autotep]#
```

METHOD AND SYSTEM FOR ESTABLISHING BIDIRECTIONAL TUNNEL

CROSS-REFERENCE TO RELATED APPLICATION

This application claims the benefit of Korean Patent Application No. 10-2004-0086547, filed on Oct. 28, 2004, in the Korean Intellectual Property Office, the disclosure of which is incorporated herein by reference

BACKGROUND OF THE INVENTION

1. Field of the Invention

The present invention relates to tunnel service capable of data communication between different communication networks, and more particularly, to a method and system for establishing a bi-directional tunnel between a tunnel end point (TEP) and a user node which wish to communicate using Internet protocol version 6 (IPv6) in an Internet protocol version 4 (IPv4) network environment.

2. Description of the Related Art

Internet communication networks may be based on IPv4 or IPv6.

IPv4 is a network layer protocol that uses 32-bit Internet protocol (IP) addresses. As the number of addresses available is consumed by Internet users, an IPv4 address shortage appears to be inevitable in the long run. To solve the IPv4 address shortage, IPv6, which was called IP Next Generation (IPng), has been proposed by the Internet Engineering Task Force (IETF). IPv6 uses 128-bit Internet protocol addresses. An IPv6 header allows extensions of the header region, so that the big drive for IPv6 is new uses, such as packet authenticity, data integrity extension, privacy extension, and so on.

Since IPv4 and IPv6 are different protocols, when a user node connected to the IPv4-based network wishes to use IPv6 communication, a bidirectional IPv6-over-IPv4 tunnel must be established using a TEP connected to both IPv4-based networks and IPv6-based networks. The bidirectional IPv6-over-IPv4 tunnel supports IPv6 connection in the IPv4-based network.

In order to establish the bidirectional IPv6-over-IPv4 tunnel, the user node needs network information such as the IPv4 address of the TEP and the IPv6 address of the user node, and the TEP needs network information such as the IPv4 address of the user node and the IPv6 address of the TEP.

However, since existing networks spontaneously do not provide network information, a user and TEP manager must exchange network information necessary for establishing the bidirectional IPv6-over-IPv4 tunnel by means of a phone call, messenger, email, advance notice, etc. The user and TEP manager manually establish the bidirectional IPv6-over-IPv4 tunnel using the exchanged network information. For example, the user and TEP manager prepare a script using the network information, store the script as a file, and establish the bidirectional IPv6-over-IPv4 tunnel using the stored script file.

Therefore, when network information of the user node and TEP is changed, the user and TEP manager must manually establish the bidirectional IPv6-over-IPv4 tunnel using the changed network information. For example, when the user node moves to another network area, which causes a change in network information of the user node or the TEP, the user and TEP manager must manually establish the bidirectional IPv6-over-IPv4 tunnel. However, since the TEP is a service entity, the change in network information of a plurality of user nodes makes it difficult to provide the TEP manager with changed network information. The change in network information of the user node and the TEP makes it impossible for the user and TEP manager to grasp each other's network information, meaning that continuous tunneling service may not be provided to the user node.

SUMMARY OF THE INVENTION

Additional aspects and/or advantages of the invention will be set forth in part in the description which follows and, in part, will be apparent from the description, or may be learned by practice of the invention.

The present invention provides a method and system for establishing a bi-directional tunnel through direct communication between a tunnel end point (TEP) and a user node wishing to communicate using Internet protocol version 6 (IPv6) in an Internet protocol version 4 (IPv4) network environment.

The present invention also provides a method and system for establishing a bi-directional tunnel between the TEP and the user node in order to support mobility of the user node.

The present invention also provides a method and system for establishing a bi-directional tunnel between the TEP and the user node in order to provide the user node with continuous tunneling service in spite of changes in network information of the user node and the TEP.

The present invention also provides a method and system for establishing a bi-directional IPv6-over-IPv4 tunnel without user assistance.

According to an aspect of the present invention, there is provided a method of establishing a bi-directional tunnel between a user node and a tunnel end point (TEP) in a first network including the user node, a dynamic host configuration protocol (DHCP) server, and one or more TEPs, the method: operating the user node in order to establish the bi-directional tunnel, wherein operating the user node includes: requesting network information necessary for establishing the bi-directional tunnel to the DHCP server; when the user node receives the network information from the DHCP server, establishing a unidirectional tunnel from the user node to the TEP based on the received network information; requesting one of the TEPs to establish the unidirectional tunnel; and when the user node receives a router advertisement (RA) message of a second network with which the user node wishes to communicate from the TEP required to establish the unidirectional tunnel, establishing an address of the user node in the second network.

According to another aspect of the present invention, there is provided a method of establishing a bi-directional tunnel between a user node and a TEP in a first network including the user node, a DHCP server, and one or more TEPs, the method including: operating the TEP in order to establish the bi-directional tunnel, wherein operating the TEP includes: when the TEP receives a tunnel configuration request message from the user node, establishing a unidirectional tunnel from the TEP to the user node based on information network included in the tunnel configuration request message; when the TEP establishes the unidirectional tunnel, sending the RA message of a second network with which the user node wishes to communicate to the user node; and when the TEP fails to establish the unidirectional tunnel, sending a message informing of the configuration failure of the unidirectional tunnel to the user node.

According to still another aspect of the present invention, there is provided a method of establishing a bi-directional tunnel between a user node and a TEP in a first network including the user node, a DHCP server, and one or more TEPs, the method comprising: the user node requesting network information necessary for establishing the bi-directional tunnel from the DHCP server; when the user node receives the network information from the DHCP server, communicating with one of the TEPs and establishing the bidirectional tunnel between the user node and the TEP based on the received network information; and when the user node receives an RA message of a second network with which the user node wishes to communicate from the TEP, establishing an address of the user node in the second network based on the RA message.

According to yet another aspect of the present invention, there is provided a system for establishing a bi-directional tunnel between a user node and a TEP in a first network including the user node, a DHCP server, and one or more TEPs, wherein the user node includes: a tunnel configuration agent which receives network information necessary for establishing the bi-directional tunnel from the DHCP server, establishes a unidirectional tunnel from the user node to the TEP based on the received network information, and communicates in order to establish the bi-directional tunnel with the TEP; an address configuration unit, which, when the RA message of a second network with which the user node wishes to communicate is provided from the TEP, establishes an address of the second network of the user node based on the RA message; and a dual stack which manages an address of the first network and the address of the second network of the user node.

According to a further aspect of the present invention, there is provided a system for establishing a bi-directional tunnel between a user node and a TEP in a first network including the user node, a DHCP server, and one or more TEPs, wherein the TEP includes: a port which exchanges messages with the user node in order to establish the bi-directional tunnel; a parser which parses messages received through the port; a controller which controls to establish the unidirectional tunnel from the TEP to the user node based on the message parsed by the parser; a tunnel information handler which is controlled by the controller and manages network information necessary for establishing the unidirectional tunnel; and a tunnel configuration unit which establishes the unidirectional tunnel based on tunnel information provided from the tunnel information handler.

According to a further aspect of the present invention, there is provided a system for establishing a bi-directional tunnel between a user node and a TEP in a first network including the user node, a DHCP server, and one or more TEPs, wherein the user node includes: a first tunnel configuration agent which establishes a first unidirectional tunnel from the user node to the TEP based on network information received from the DHCP server, and communicates with the TEP in order to establish the bi-directional tunnel, wherein the TEP includes a second tunnel configuration agent which establishes a second unidirectional tunnel from the TEP to the user node based on a message received by communicating with the first tunnel configuration agent.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 4 is a screen showing the IPv4/IPv6 user node establishing the bi-directional tunnel in a new network;

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

The present invention will now be described more fully with reference to the accompanying drawings, in which preferred embodiments of the invention are shown.

Figure 1:
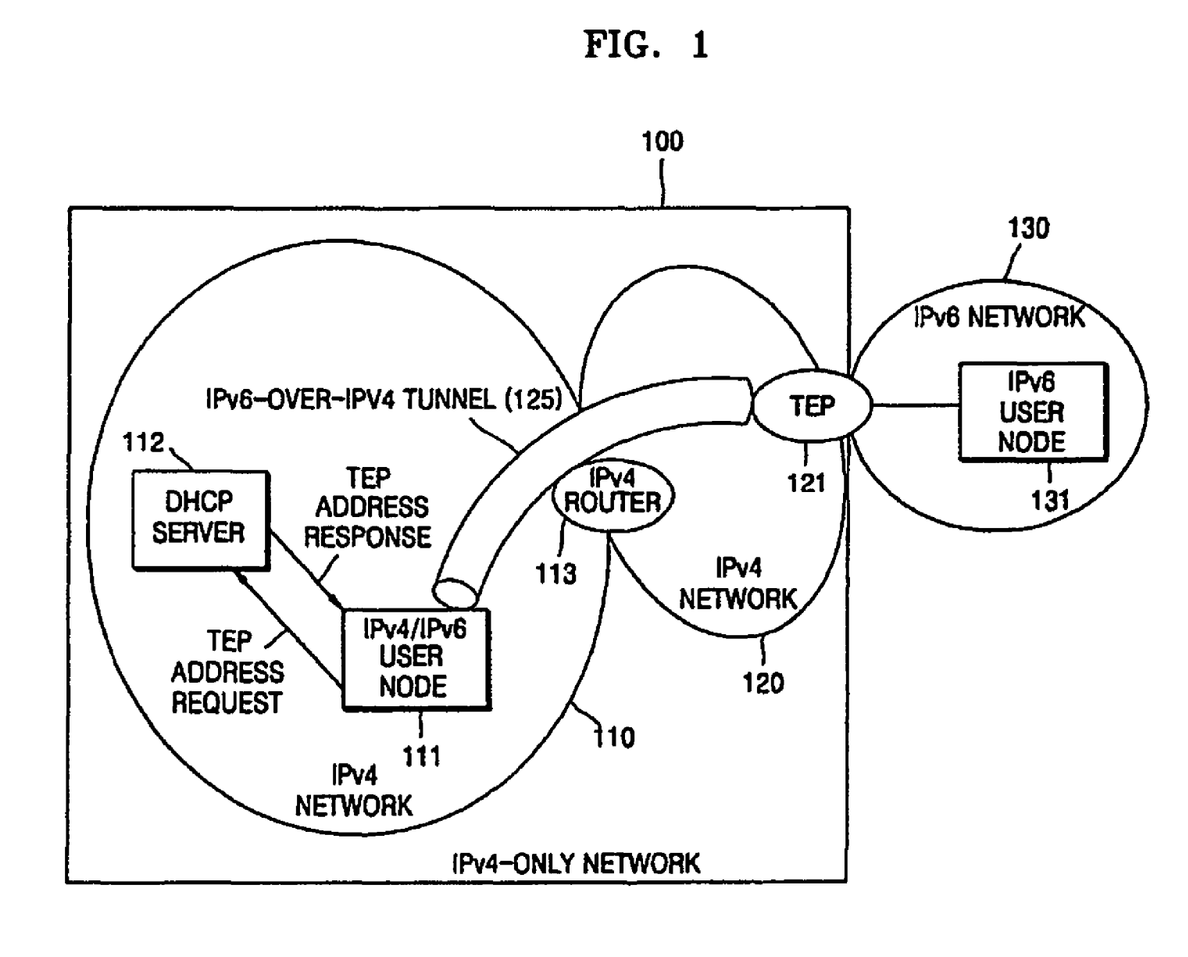
FIG. 1 is a diagram of a network to which a system for establishing a bi-directional tunnel is applied according to an embodiment of the present invention.

FIG. 1 is a diagram of a network to which a system for establishing a bi-directional tunnel is applied according to an embodiment of the present invention.

Referring to FIG. 1, the system establishes a bi-directional IPv6-over-IPv4 tunnel 125 for data communication between an IPv4/IPv6 user node 111 in an IPv4-only network 100 and an IPv6 user node 131 in an IPv6 network 130.

The IPv4-based network 100, which is an IPv4-based Internet communication network, includes a plurality of IPv4 networks 110 and 120 shown in FIG. 1. The plurality of IPv4 networks 110 and 120 are different subnets, for IPv4 communication. The IPv4/IPv6 user node 111 and a tunnel end point (TEP) 121 are connected to the same IPv4-based network or different IPv4-based networks.

The IPv4 networks 110 includes the IPv4/IPv6 user node 111, a dynamic host configuration protocol (DHCP) server 112, and an IPv4 router 113.

The IPv4/IPv6 user node 111 may have a dual stack structure in order to store Internet protocol addresses. To be more specific, the IPv4/IPv6 user node 111 stores IPv4-based Internet protocol addresses (hereinafter referred to as "IPv4 addresses") and IPv6-based Internet protocol addresses (hereinafter referred to as "IPv6 addresses") in separate stacks, and uses an IPv4 address and IPv6 address as source addresses used to communicate data.

The IPv4/IPv6 user node 111 may use a static IPv4 address or a dynamic IPv4 address. If the IPv4/IPv6 use node 111 uses the static address, the IPv4/IPv6 user node 111 disregards the dynamic IPv4 address allocated by the DHCP server 112. However, the IPv4/IPv6 user node 111 for which no static IPv4 address has been established uses the dynamic IPv4 address allocated to the IPv4/IPv6 user node 111 from the DHCP server 112.

The IPv6 address is generated based on an IPv6 router advertisement (RA) message from the TEP 121 after the bidirectional tunnel is established. The IPv4/IPv6 user node 111 parses a prefix of the IPv6 RA message and performs an IPv6 address auto configuration process based on the parsing result to generate the IPv6 address.

The IPv4/IPv6 user node 111 requests the DHCP server 112 for network information necessary for establishing the bi-directional IPv6-over-IPv4 tunnel 125. Network information includes an IPv4 address of the TEP 121. Therefore, a request for network information can be defined as a request for the IPv4 address of the TEP 121.

The IPv4/IPv6 user node 111 receives network information including the IPv4 address of the TEP 121 from the DHCP server 112, and extracts the IPv4 address of the TEP 121 from the network information. The network information has a DHCP format. Therefore, the network information can be defined as a DHCP message.

The IPv4/IPv6 user node 111 establishes a unidirectional tunnel from the IPv4/IPv6 user node 111 to the TEP 121 using the IPv4 address of the TEP 121. For example, the IPv4/IPv6 user node 111 prepares a script using the IPv4 address of the TEP 121 extracted from the network information, and establishes the unidirectional tunnel using the script.

Figure 2:
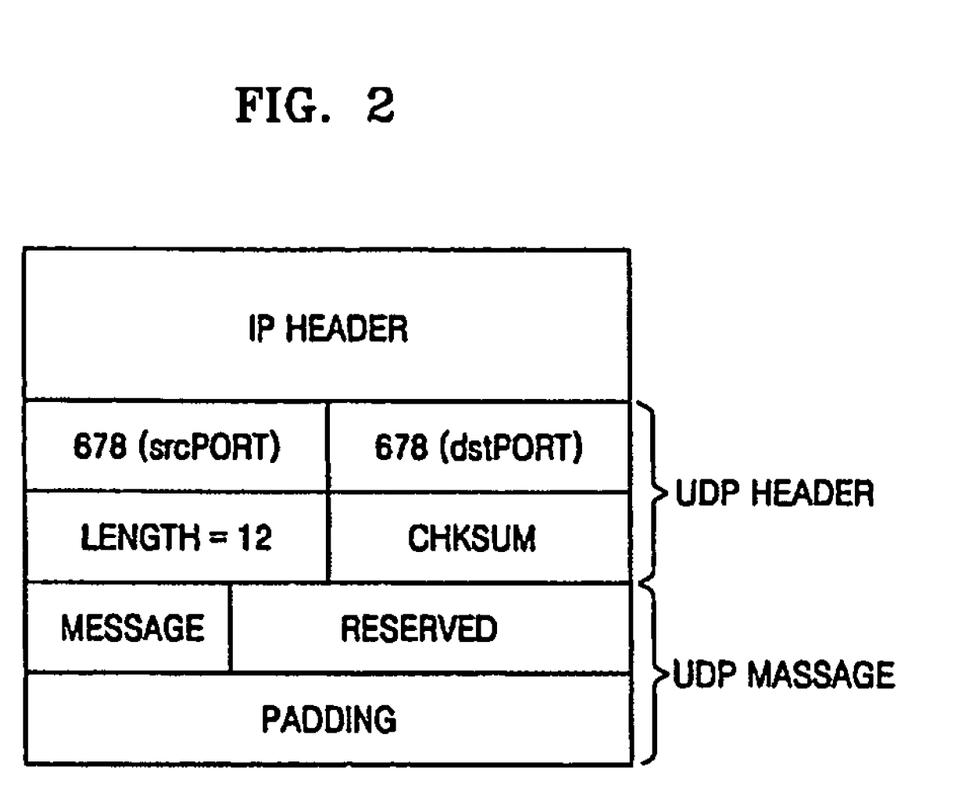
FIG. 2 is a structural diagram of a User Datagram Protocol (UDP) message sent by an IPv4/IPv6 user node to a tunnel end point (TEP) shown in FIG. 1.

The IPv4/IPv6 user node 111 sends a tunnel configuration request message to the TEP 121 via the IPv4 router 113 in order to establish the unidirectional tunnel from the TEP 121 to the IPv4/IPv6 user node 111. The IPv4/IPv6 user node 111 can send the tunnel configuration request message using either transport control protocol (TCP), user datagram protocol (UDP), or Internet control message protocol (ICMP) according to an IPv4 network environment. If UDP is used to send the tunnel configuration request message, the IPv4/IPv6 user node 111 sends a UDP message as shown in FIG. 2 to the TEP 121.

When the IPv4/IPv6 user node 111 receives the IPv6 RA message from the TEP 121 after the unidirectional tunnel from the TEP 121 to the IPv4/IPv6 user node 111 has been established, it performs the IPv6 address auto configuration process. To this end, the IPv4/IPv6 user node 111 includes an element (not shown) to perform the IPv6 address auto configuration process. The IPv6 address generated by the IPv6 address onto configuration process is referred to as a global IPv6 address of the IPv4/IPv6 user node 111. With the global IPv6 address generated, the bidirectional IPv6-over-IPv4 tunnel 125 is completely established. The IPv4/IPv6 user node 111 can normally communicate with the IPv6 user node 131 using IPv6.

The IPv4/IPv6 user node 111 may be a mobile host such as a notebook computer or personal digital assistant (PDA), or a non-mobile host such as a desktop computer.

The DHCP server 112 manages the IPv4 address of at least one TEP connected to the IPv4-only network 100 provided from an Internet service provider (ISP) (not shown), and provides the IPv4/IPv6 user node 111 with the DHCP message including the IPv4 address of at least one TEP at the request of the IPv4/IPv6 user node 111 for the network information or TEP address.

The IPv4 address of the TEP may be included in an option field of the DHCP message. A plurality of IPv4 addresses of the TEP may be included in the option field of the DHCP message. If the option field of the DHCP message includes a plurality of IPv4 addresses of the TEP, the IPv4/IPv6 user node 111 selects one of the plurality of IPv4 addresses of the TEP based on a predetermined selection method, for example, a round robin method.

The IPv4 router 113 is a typical IPv4 router connecting the IPv4 network 110 and IPv4 network 120. The IPv4/IPv6 user node 111 establishes the IPv6-over-IPv4 tunnel 125 with the TEP 121 via the IPv4 router 113 as shown in FIG. 1. However, the IPv4/IPv6 user node 111 may establish the IPv6-over-IPv4 tunnel 125 via use a plurality of IPv4 routers that are not shown in FIG. 1.

When the TEP 121 receives the tunnel configuration request message from the IPv4/IPv6 user node 111, it authenticates the IPv4/IPv6 user node 111 using an ISP intrinsic protocol, and establishes the unidirectional tunnel from the TEP 121 to the IPv4/IPv6 user node 111. When the TEP 121 establishes the unidirectional tunnel, it sends the IPv6 RA message to the IPv4/IPv6 user node 111 via the unidirectional tunnel. The bidirectional IPv6-over-IPv4 tunnel 125 between the TEP 121 and the IPv4/IPv6 user node 111 is established.

The IPv4/IPv6 user node 111 can communicate IPv6 data with the IPv6 user node 131 via the TEP 121. The TEP 121 is referred to as a tunnel router.

Figure 3:
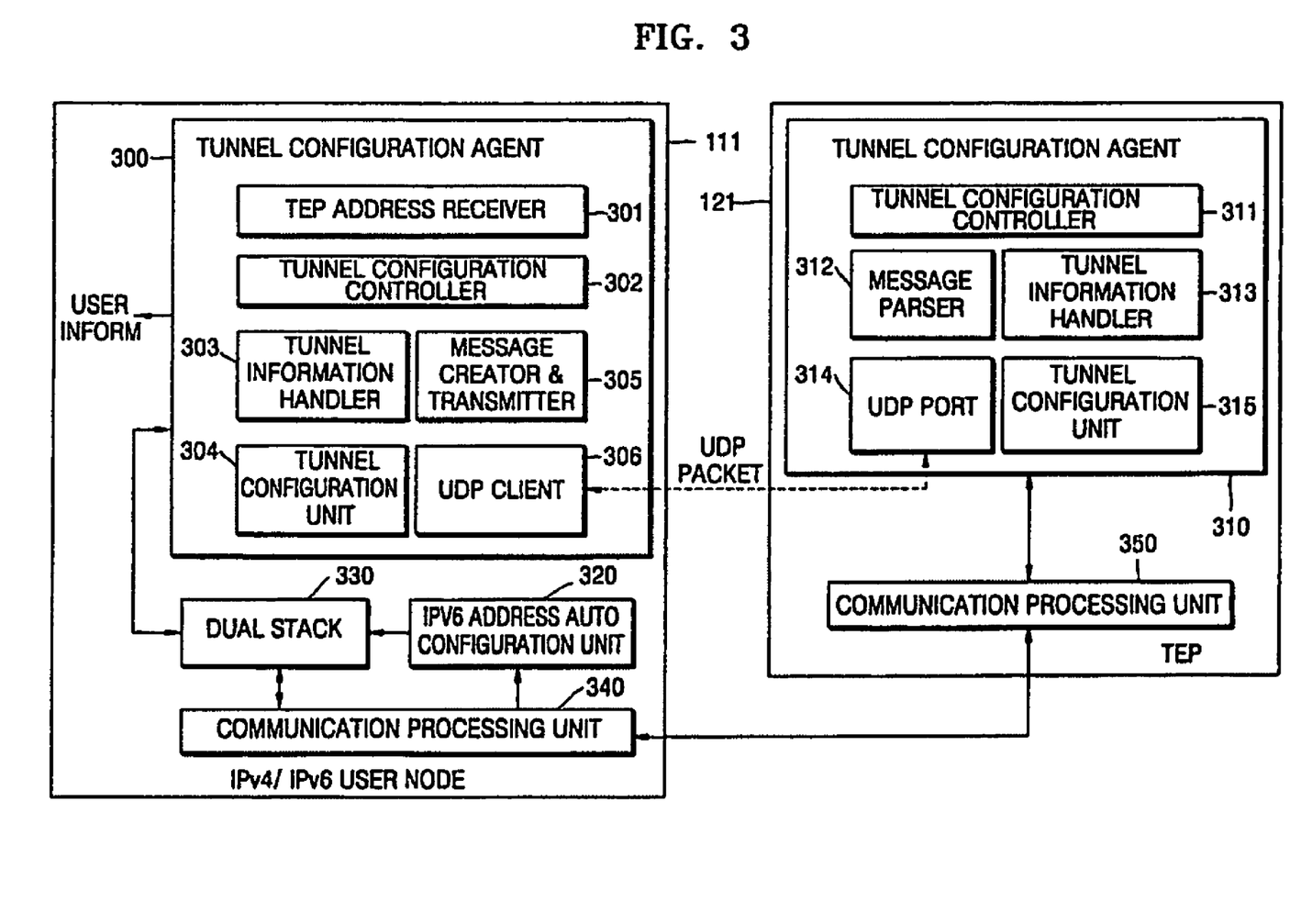
FIG. 3 is a block diagram of the IPv4/IPv6 user node and TEP shown in FIG. 1.

The IPv4/IPv6 user node 111 and TEP 121 are configured as shown in FIG. 3. FIG. 3 is a block diagram of the IPv4/IPv6 user node 111 and TEP 121 shown in FIG. 1. Referring to FIG. 3, the IPv4/IPv6 user node 111 includes a tunnel configuration agent 300, an IPv6 address auto configuration unit 320, a dual stack 330, and a communication processing unit 340.

The tunnel configuration agent 300 includes a TEP address receiver 301, a tunnel configuration controller 302, a tunnel information handler 303, a tunnel configuration unit 304, a message creator & transmitter 305, and a UDP client 306.

The TEP address receiver 301 extracts the IPv4 address of the TEP 121 from network information received from the DHCP server 112, and transmits the extracted IPv4 address to the tunnel configuration controller 302.

The tunnel configuration controller 302 requests the IPv4 address of the TEP 121 or network information for establishing a tunnel to the DHCP server 112, controls the tunnel information handler 303 in order to establish a unidirectional tunnel from the IPv4/IPv6 user node 111 to TEP 121 using the IPv4 address of the TEP 121 received from the TEP address receiver 301, and controls the message creator & transmitter 305 in order to request the unidirectional tunnel and a unidirectional tunnel having the opposite direction to the unidirectional tunnel from the IPv4/IPv6 user node 111 to TEP 121 to be established. The tunnel configuration controller 302 provides an IPv4 address of the IPv4/IPv6 user node 111 that is included in network information received from the DHCP server 112 as a dual stack 330.

The tunnel information handler 303 manages the IPv4 address of the TEP 121 provided by the tunnel configuration controller 302, and instructs the tunnel configuration unit 304 to establish the unidirectional tunnel from the IPv4/IPv6 user node 111 to the TEP 121. That is, the tunnel information handler 303 stores the IPv4 address of a TEP provided by the tunnel configuration controller 302, and, if each of IPv4 addresses of a plurality of TEPs is stored, can select one address based on a first in first out (FIFO) algorithm, for example.

The tunnel configuration unit 304 prepares a script using an IPv4 address of the TEP 121 provided by the tunnel information handler 303, stores the script as a file, and establishes the unidirectional tunnel from the IPv4/IPv6 user node 111 to the TEP 121 using the script file.

The message creator & transmitter 305 creates a unidirectional tunnel configuration request message to be sent to the TEP 121 controlled by the tunnel configuration controller 302. The tunnel configuration request message is a packet having a format suitable for TCP, UDP, or ICMP. The tunnel configuration agent 300 transmits the tunnel configuration request message using UDP. The message creator & transmitter 305 can create a packet having a UDP format as shown in FIG. 2. The message creator & transmitter 305 transmits the message to the UDP client 306.

The message creator & transmitter 305 receives the message from the TEP 121 from the UDP client 306 and transmits it to the tunnel configuration controller 302. The message from the TEP 121 may include a tunnel configuration complete message or a tunnel configuration failure message.

The UDP client 306 transmits a UDP packet received from the message creator & transmitter 305 for a tunnel configuration request to the TEP 121, and the message received from the TEP 121, to the message creator & transmitter 305.

The message creator & transmitter 305 and the UDP client 306 communicate data between the TEP 121 and the IPv4/IPv6 user node 111 in order to establish the bi-directional IPv6-over-IPv4 tunnel 125.

The tunnel configuration complete message or tunnel configuration failure message received from the TEP 121 is provided to the tunnel configuration controller 302 via the message creator & transmitter 305 and UDP client 306. The tunnel configuration controller 302 analyzes the tunnel configuration failure message and informs a user of a tunnel configuration failure, or controls the tunnel information handler 303 using another IPv4 address of another TEP to retry tunnel configuration establishment.

When the uni-directional IPv6-over-IPv4 tunnel 125 from the TEP 121 to the IPv4/IPv6 user node 111 is established, the communication processing unit 350 of the TEP 121 broadcasts the IPv6 RA message. The communication processing unit 340 of the IPv4/IPv6 user node 111 receives the IPv6 RA message.

The communication processing units 340 and 350 that a socket for data communication of IPv6 between the IPv4/IPv6 user node 111 and the IPv6 user node 131 relating to the IPv6-over-IPv4 tunnel 125 make it possible to transmit and receive a packet with layer 2 (L2) level between the TEP 121 and the IPv4/IPv6 user node 111. The communication processing unit 340 receives the IPv6 RA message to transmit it to the IPv6 address auto configuration unit 320 in order to allow the IPv6 address of the IPv4/IPv6 user node 111 to be automatically generated.

The IPv6 address auto configuration unit 320 receives the IPv6 RA message from the communication processing unit 340 and automatically generates the IPv6 address of the IPv4/IPv6 user node 111 based on a prefix of the IPv6 RA message. The generated IPv6 address is provided to the dual stack 330.

The dual stack 330 stores the IPv4 address of the IPv4/IPv6 user node 111 provided by the tunnel configuration agent 300 and IPv6 address provided by the IPv6 address auto configuration unit 320 in separate stack. If the static IPv4 address is stored in the dual stack 330, it disregards the IPv4 address of the IPv4/IPv6 user node 111 provided by the tunnel configuration agent 300.

The TEP 121 includes a tunnel configuration agent 310 and the communication processing unit 350. The tunnel configuration agent 310 includes a tunnel configuration controller 311, a message parser 312, a tunnel information handler 313, a UDP port 314, and a tunnel configuration unit 315.

The tunnel configuration controller 311 controls the message parser 312 and tunnel information handler 313 in order to establish the unidirectional tunnel from the TEP 121 to the IPv4/IPv6 user node 111.

The message parser 312 parses the UDP packet received via the UDP port 314, and transmits the parsed UDP packet to the tunnel configuration controller 311. The tunnel configuration controller 311 receives the tunnel configuration request message transmitted from the IPv4/IPv6 user node 111.

The UDP port 314 receives the UDP packet transmitted from the IPv4/IPv6 user node 111, and transmits the UDP packet to the IPv4/IPv6 user node 111. the UDP port 314 is previously placed in standby in order to receive the UDP packet, which has the same format as shown in FIG. 2. The UDP packet defines a message field based on previously defined code information in order to determine its use.

For example, when a UDP packet transmitted from the UDP port 314 to the UDP client 306 defines the message field (message region in FIG. 2) as "01,", the UDP packet is a tunnel configuration request message; when a UDP packet defines the message field as "EE", the UDP packet is a tunnel terminating request message; when a UDP packet defines the message field as "77", the UDP packet is a tunnel configuration OK message; when a UDP packet defines the message field as "FF", the UDP packet is a tunnel configuration failure message due to a full slot of the TEP 121; when a UDP packet defines the message field as "F0", the UDP packet is a tunnel configuration failure message that requests a tunnel configuration again; when a UDP packet defines the message field as "FA", the UDP packet is a tunnel configuration failure message that indicates service unavailability; when a UDP packet defines the message field as "FD", the UDP packet is a tunnel configuration failure message that does not allow a tunnel configuration for the IPv4/IPv6 user node 111; and when a UDP packet defines the message field as "94", the UDP packet is a tunnel configuration failure message that indicates service unavailability while recommending another TEP. The UDP packet is configured based on the previously defined code information (01, EE, FF, . . . ) according to the type of the UDP packet. The tunnel configuration OK message and tunnel configuration failure message are included in the tunnel configuration response message transmitted from the TEP 121 to the IPv4/IPv6 user node 111.

The tunnel information handler 313 stores the IPv4 address of the IPv4/IPv6 user node 111 provided by the tunnel configuration controller 311, and requests the tunnel configuration unit 315 to establish the unidirectional tunnel from the TEP 121 to the IPv4/IPv6 user node 111.

The tunnel configuration unit 315 establishes the unidirectional tunnel from the TEP 121 to the IPv4/IPv6 user node 111 using the IPv4 address of the IPv4/IPv6 user node 111 provided by the tunnel information handler 313. The tunnel configuration unit 315 confirms the unidirectional tunnel establishment from the TEP 121 to the IPv4/IPv6 user node 111 via the UDPport 314.

The tunnel configuration agents 300 and 310 transmit a packet using UDP. The message creator & transmitter 305, UDP client 306, the UDPport 314, and message parser 312 are designed and configured to transmit the packet between the IPv4/IPv6 user node 111 and the TEP 121 using either TCP, UDP, or ICMP. For example, the tunnel configuration agent 310 further includes a TCP port for TCP communication to confirm tunnel configuration via the TCP port, or establishes an interusable type for ICMP communication to confirm tunnel configuration. The tunnel configuration agent 300 is designed to transmit a message having a format corresponding to the tunnel configuration agent 310.

When a tunnel from the TEP 121 to the IPv4/IPv6 user node 111 is established, the communication processing unit 350 sends the IPv6 RA message to the IPv4/IPv6 user node 111. The IPv4/IPv6 user node 111 generates the IPv6 address using the IPv6 RA message to establish the bidirectional IPv6-over-IPv4 tunnel 125 between the TEP 121 and the IPv4/IPv6 user node 111, and communicates with the IPv6 user node 131 using IPv6 via the TEP 121. The IPv6 user node 131 having an IPv6 function may be a mobile host or non-mobile host.

FIG. 4 is a screen showing the IPv4/IPv6 user node 111 establishing the bi-directional tunnel by the tunnel configuration agent 300 for IPv6 communication after connecting to a new IPv4 network. FIG. 4 shows that no user configuration control is necessary to establish the bi-directional tunnel.

Figure 5:
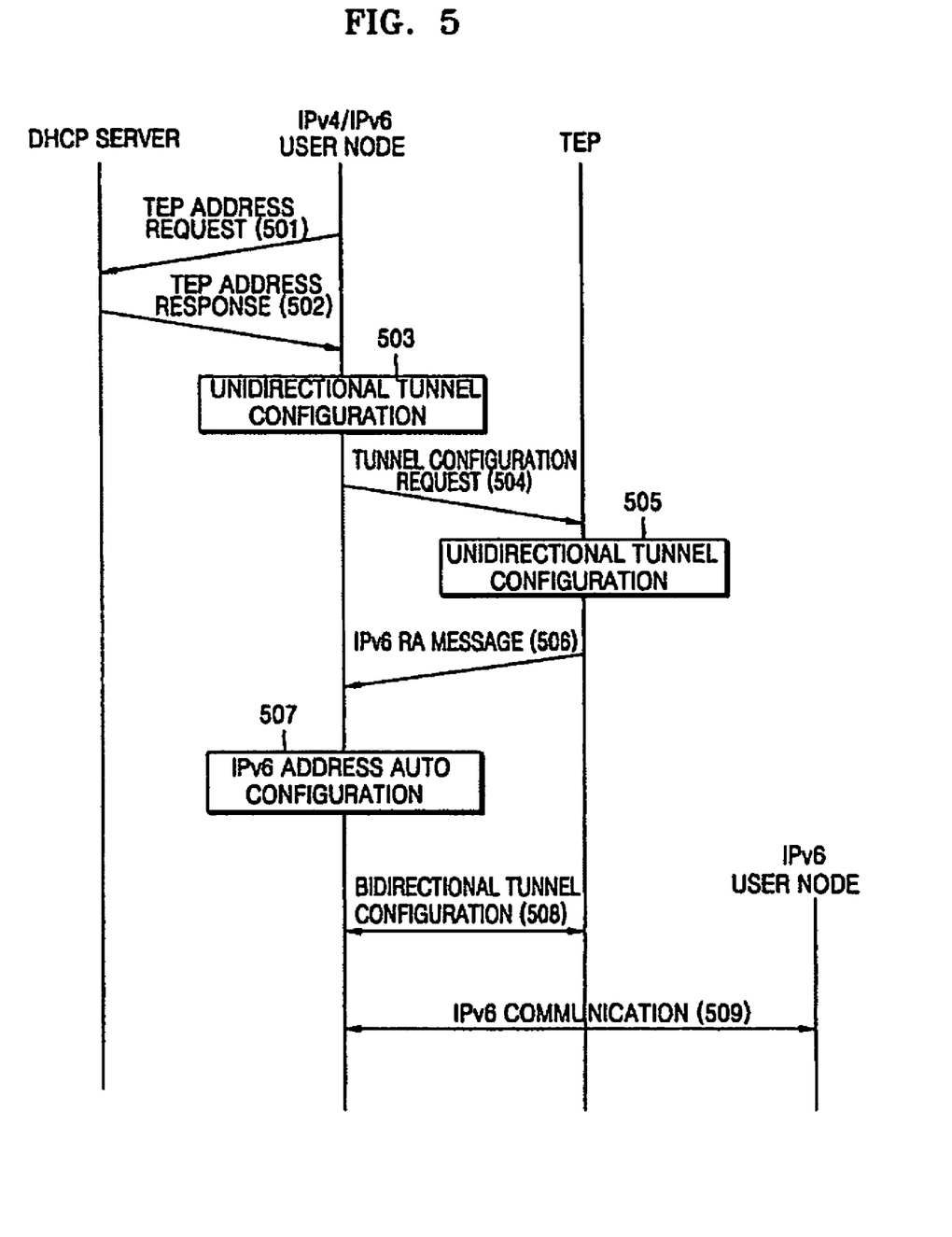
FIG. 5 is a flowchart describing a method of establishing a bi-directional tunnel according to an embodiment of the present invention.

FIG. 5 is a flowchart describing a method of establishing a bi-directional tunnel according to an embodiment of the present invention. The flowchart will be described with reference to FIG. 1.

The IPv4/IPv6 user node 111 connects to a new IPv4 network and sends a TEP address request message to the DHCP server 112 (Operation 501). The message, which requires network information necessary for establishing the bi-directional tunnel between TEP 121 and IPv4/IPv6 user node 111, may be DHCP-DISCOVER or DHCP-REQUEST. If the IPv4 network has a plurality of DHCP servers, the IPv4/IPv6 user node 111 selects one DHCP server and sends the TEP address request message to the selected DHCP server.

The DHCP server 112 provides the IPv4/IPv6 user node 111 with a DHCP message including an IPv4 address of the IPv4/IPv6 user node 111 and an IPv4 address of the TEP 121 as a TEP address response (Operation 502), which may be DHCP OFFER, DHCP ACK, or network information response. The TEP address response may include IPv4 addresses of a plurality of TEPs. The plurality of TEPs are tunnel routers connected to the IPv4-only network 100 and IPv6 network 130. The DHCP message includes the IPv4 address of the IPv4/IPv6 user node 111.

The IPv4/IPv6 user node 111 receives the TEP address response, establishes the unidirectional tunnel from the IPv4/IPv6 user node 111 to the TEP 121 using the IPv4 address of the IPv4/IPv6 user node 111 and the IPv4 address of the TEP 121 (Operation 503). The tunnel configuration agent 300 installed in the IPv4/IPv6 user node 111 establishes the unidirectional tunnel.

The IPv4/IPv6 user node 111 sends a tunnel configuration request message to the TEP 121 (Operation 504). The tunnel configuration request message may be transmitted as a UDP packet. If the tunnel configuration request message is a UDP packet, the tunnel configuration request message may be UDP Request, while it is transmitted using either TCP, UDP, or ICMP.

The TEP 121 receives the tunnel configuration request message and establishes the unidirectional tunnel from the TEP 121 to the IPv4/IPv6 user node 111 (Operation 505). That is, the TEP 121 parses the received tunnel configuration request message to extract the IPv4 address of the IPv4/IPv6 user node 111 and establish the unidirectional tunnel from the TEP 121 to the IPv4/IPv6 user node 111 using the extracted the IPv4 address of the IPv4/IPv6 user node 111 and the IPv4 address of the TEP 121.

The TEP 121 establishes the unidirectional tunnel and sends a tunnel configuration response message indicating that the unidirectional tunnel has been completely established to the IPv4/IPv6 user node 111 (Operation 506).

The TEP 121 transmits an RA message of the IPv6 network required to be communicated by the IPv4/IPv6 user node 111 to the IPv4/IPv6 user node 111 (Operation 507). The IPv4/IPv6 user node 111 automatically establishes the IPv6 address of the IPv4/IPv6 user node 111 based on a prefix of the IPv6 RA message. The bidirectional IPv6-over-IPv4 tunnel 125 between the TEP 121 and the IPv4/IPv6 user node 111 is established (Operation 509) so that the IPv4/IPv6 user node 111 communicates with the IPv6 used node 131 using IPv6 (Operation 510).

Figure 6:
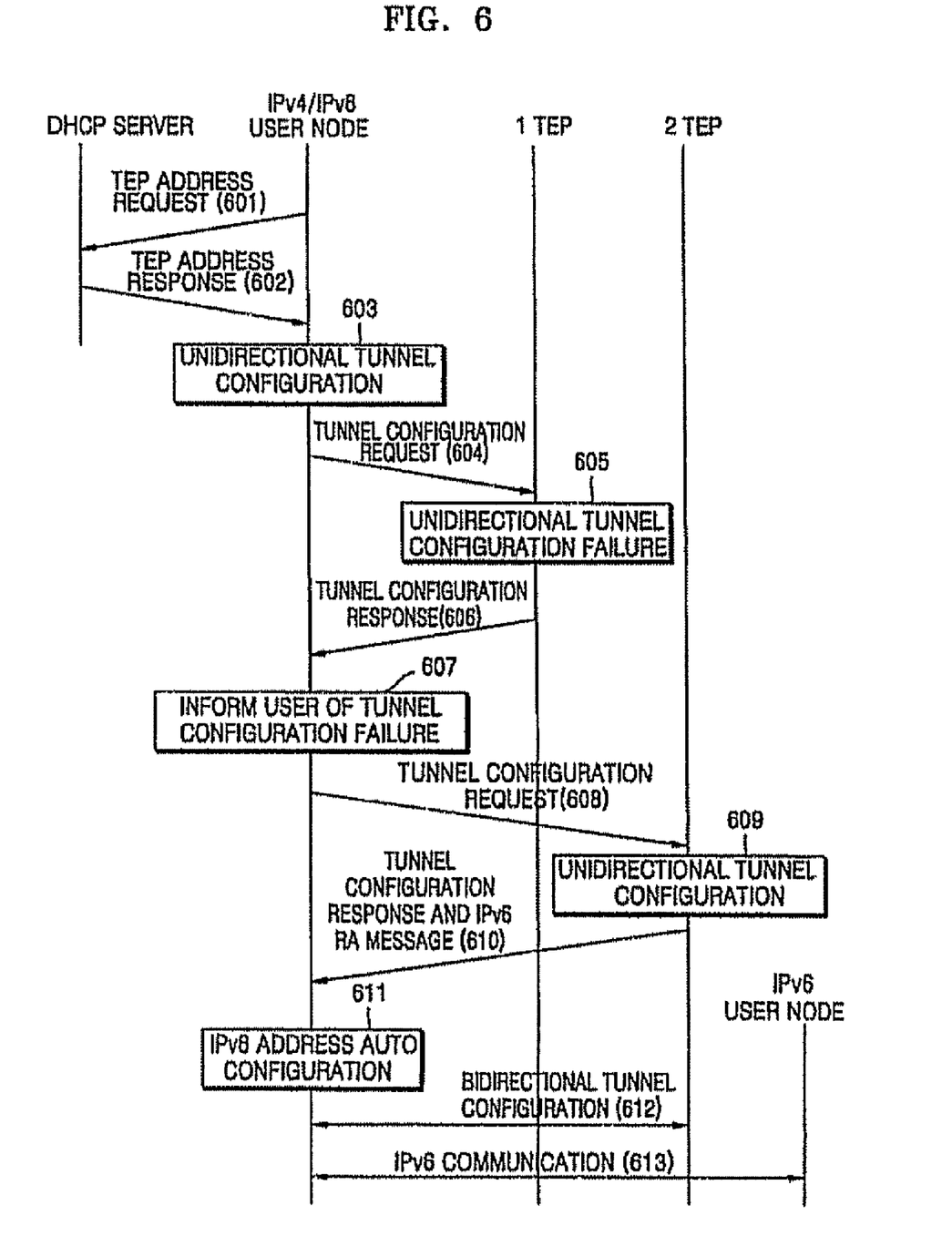
FIG. 6 is a flowchart describing a method of establishing a bi-directional tunnel according to another embodiment of the present invention.

FIG. 6 is a flowchart describing a method of establishing a bi-directional tunnel according to another embodiment of the present invention. Operations 601 to 604 of FIG. 6 are the same as Operations 501 to 504 of FIG. 5, and Operations 608 to 613 of FIG. 6 are the same as Operations 504 to 510 of FIG. 5, and therefore these operations will not be described again.

Referring to FIG. 6, since the TEP 121 fails to establish the unidirectional tunnel from the TEP 121 to the IPv4/IPv6 user node 111, another TEP is used to establish the unidirectional tunnel. A first TEP corresponding to the TEP 121 of FIG. 5 and a second TEP corresponding to another TEP are shown in FIG. 6.

The IPv4/IPv6 user node 111 requests the first TEP to establish the unidirectional tunnel. However, since the fist TEP fails to establish the unidirectional tunnel (Operation 605), it sends a tunnel configuration response message that indicates failure in establishing the unidirectional tunnel to the IPv4/IPv6 user node 111 (Operation 606). There are several reasons that the fist TEP can fail to establish the unidirectional tunnel. The reasons are described in code information defined in a message region with reference to FIG. 2.

The IPv4/IPv6 user node 111 receives the tunnel configuration response message that indicates failure in establishing the unidirectional tunnel from the first TEP and informs a user of the tunnel configuration failure (Operation 607). The IPv4/IPv6 user node 111 sends a tunnel configuration request message using an IPv4 address of a TEP other than the first TEP of those received from the DHCP server 112 (Operation 608). If the IPv4 address is the IPv4 address of the second TEP, the IPv4/IPv6 user node 111 can send the tunnel configuration request message to the second TEP. If there is no IPv4 address except that of the first TEP, the IPv4/IPv6 user node 111 sends the tunnel configuration request message to the first TEP again. The second TEP establishes the unidirectional tunnel as described in the TEP 121 of FIG. 5 (Operation 609).

As described above, the bi-directional tunnel between a user node and a TEP is automatically established without user assistance, so that the tunneling service is continuously provided to the user node in spite of changes in a network connected to the user node. For example, the user node in a mobile IPv4 network environment can be continuously connected to an IPv6 network according to the method of establishing the bidirectional tunnel.

The user is not required to know TEP information of a new network, and a TEP manager is not required to know information of changed user nodes.

While this invention has been particularly shown and described with reference to preferred embodiments thereof, it will be understood by those skilled in the art that various changes in form and details may be made therein without departing from the spirit and scope of the invention as defined by the appended claims.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of establishing a bi-directional tunnel between a user node and a tunnel end point (TEP) in a first network including the user node, a dynamic host configuration protocol (DHCP) server, and one or more TEPs, the method comprising:
   operating the user node to establish the bi-directional tunnel,
   wherein operating the user node comprises:
      requesting network information necessary to establish the bi-directional tunnel to the DHCP server;
      requesting from the user node to the TEP to establish a unidirectional tunnel from the user node to the TEP, and establishing the unidirectional tunnel from the user node to the TEP based on the received network information when the user node receives the network information from the DHCP server;

establishing an address of the user node in a second network when the user node receives a router advertisement (RA) message of the second network with which the user node wishes to communicate from the TEP required to establish the unidirectional tunnel;

sending a tunnel configuration request message to the TEP; and establishing a second unidirectional tunnel from the TEP to the user node.

2. The method of claim 1, wherein the network information comprises an address on the first network of the one or more TEPs.

3. The method of claim 2, wherein the network information further comprises the address of the user node in the first network.

4. The method of claim 1, wherein operating the user node further comprises:
informing a user of failure to establish the bi-directional tunnel when the user node receives a tunnel configuration failure message from the TEP.

5. The method of claim 1, wherein operating the user node further comprises:
requesting another TEP to establish the unidirectional tunnel using the address on the first network of another TEP received from the DHCP server when the user node receives the tunnel configuration failure message from the TEP.

6. The method of claim 1, wherein the user node generates the address of the second network based on a prefix of the RA message of the second network.

7. The method of claim 1, wherein the first network is an IPv4 network, and the second network is an IPv6 network.

8. A method of establishing a bi-directional tunnel between a user node and a tunnel end point (TEP) in a first network including the user node, a dynamic host configuration protocol (DHCP) server, and one or more TEPs, the method comprising:
operating the TEP to establish the bi-directional tunnel, wherein operating the TEP comprises:
establishing a unidirectional tunnel from the TEP to the user node based on network information included in the tunnel configuration request message when the TEP receives a tunnel configuration request message from the user node; and
sending a router advertisement (RA) message of a second network with which the user node wishes to communicate to the user node when the TEP establishes the unidirectional tunnel.

9. The method of claim 8, further comprises:
sending a message informing of the configuration failure of the unidirectional tunnel to the user node when the TEP fails to establish the unidirectional tunnel.

10. The method of claim 9, wherein the message informing of the failure to establish the unidirectional tunnel is configured using code information regarding a plurality of predetermined failure reasons.

11. The method of claim 8, wherein the first network is an IPv4 network, and the second network is an IPv6 network.

12. The method of claim 8, wherein the tunnel configuration request message is sent by using any one of TCP (Transport Control Protocol), UDP (User Datagram Protocol), and ICMP (Internet Control Message Protocol).

13. A method of establishing a bi-directional tunnel between a user node and a tunnel end point (TEP) in a first network including the user node, a dynamic host configuration protocol (DHCP) server, and one or more TEPs, the method comprising:
the user node requesting network information necessary to establish the bi-directional tunnel from the DHCP server;
communicating with the TEP and establishing the bidirectional tunnel between the user node and the TEP based on the received network information when the user node receives the network information from the DHCP server; and
establishing an address of the user node in a second network based on the RA message when the user node receives an router advertisement (RA) message of the second network with which the user node wishes to communicate from the TEP,
wherein establishing the bi-directional tunnel comprises:
the user node establishing a first unidirectional tunnel from the user node to the TEP, and
the TEP establishing a second unidirectional tunnel from the TEP to the user node.

14. The method of claim 13, wherein establishing the bi-directional tunnel further comprises:
the user node sending a tunnel configuration request message to the TEP; and
the TEP establishes the second unidirectional tunnel when the TEP receives the tunnel configuration request message.

15. A system establishing a bi-directional tunnel between a user node and a tunnel end point (TEP) in a first network including the user node, a dynamic host configuration protocol (DHCP)-server, and one or more TEPs;
wherein the user node comprises:
a tunnel configuration agent to receive network information necessary to establish the bi-directional tunnel from the DHCP server to establish a unidirectional tunnel from the user node to the TEP based on the received network information, and to communicate to establish the bi-directional tunnel with the TEP;
an address configuration unit to establish an address of a second network of the user node based on a router advertisement (RA) message when the RA message of the second network with which the user node wishes to communicate is provided from the TEP and
a dual stack to manage an address of the first network and the address of the second network of the user node,
wherein the tunnel configuration agent comprises:
a controller to establish the bi-directional tunnel;
a message creator and transmitter, which is controlled by the controller, and which creates a first message to be provided to the TEP to establish the bi-directional tunnel, and provides the controller with a second message provided from the TEP; and
a client to transmit the first message provided from the message creator and transmitter to the TEP, to receive the second message provided from the TEP, and to provide the message creator and transmitter with the second message.

16. The system of claim 15, wherein the tunnel configuration agent further comprises:
a receiver to receive the network information:
a tunnel information handler, which is controlled by the controller, and which manages tunnel information to establish the unidirectional tunnel in the network information; and a tunnel configuration unit to establish the unidirectional tunnel based on the tunnel information provided from the tunnel information handler.

17. A system for establishing a bi-directional tunnel between a user node and a tunnel end point (TEP) in a first network including the user node, a dynamic host configuration protocol (DHCP) server, and one or more TEPs, wherein the TEP comprises:

a port to exchange messages with the user node to establish the bi-directional tunnel;

a parser to parse messages received through the port;

a controller to establish the unidirectional tunnel from the TEP to the user node based on the message parsed by the parser;

a tunnel information handler controlled by the controller and to manage network information necessary to establish the unidirectional tunnel; and a tunnel configuration unit to establish the unidirectional tunnel based on tunnel information provided from the tunnel information handler.

18. The system of claim 17, wherein the TEP further comprises:

a communication processing unit to send a router advertisement (RA) message of a second network to the user node to communicate when the unidirectional tunnel is established.

19. A system for establishing a bi-directional tunnel between a user node and a tunnel end point (TEP) in a first network including the user node, a dynamic host configuration protocol (DHCP) server, and one or more TEPs, wherein the user node comprises:

a first tunnel configuration agent to establish a first unidirectional tunnel from the user node to the TEP based on network information received from the DHCP server, and to communicate with the TEP to establish the bi-directional tunnel, wherein the TEP comprises:

a second tunnel configuration agent to establish a second unidirectional tunnel from the TEP to the user node based on a message received by communicating with the first tunnel configuration agent.

* * * * *

UNITED STATES PATENT AND TRADEMARK OFFICE
CERTIFICATE OF CORRECTION

Page 1 of 1

PATENT NO.         : 8,130,671 B2
APPLICATION NO.    : 11/259275
DATED              : March 6, 2012
INVENTOR(S)        : Soo-hong Park et al.

It is certified that error appears in the above-identified patent and that said Letters Patent is hereby corrected as shown below:

Column 1, Line 10, Delete "reference" and insert -- reference. --, therefor.

Column 12, Line 21, In Claim 13, delete "TEP, and" and insert -- TEP; and --, therefor.

Column 12, Line 34, In Claim 15, delete "(DHCP)-server," and insert -- (DHCP) server, --, therefor.

Signed and Sealed this
Twenty-ninth Day of May, 2012

David J. Kappos
*Director of the United States Patent and Trademark Office*